United States Patent Office 3,210,927
Patented Oct. 12, 1965

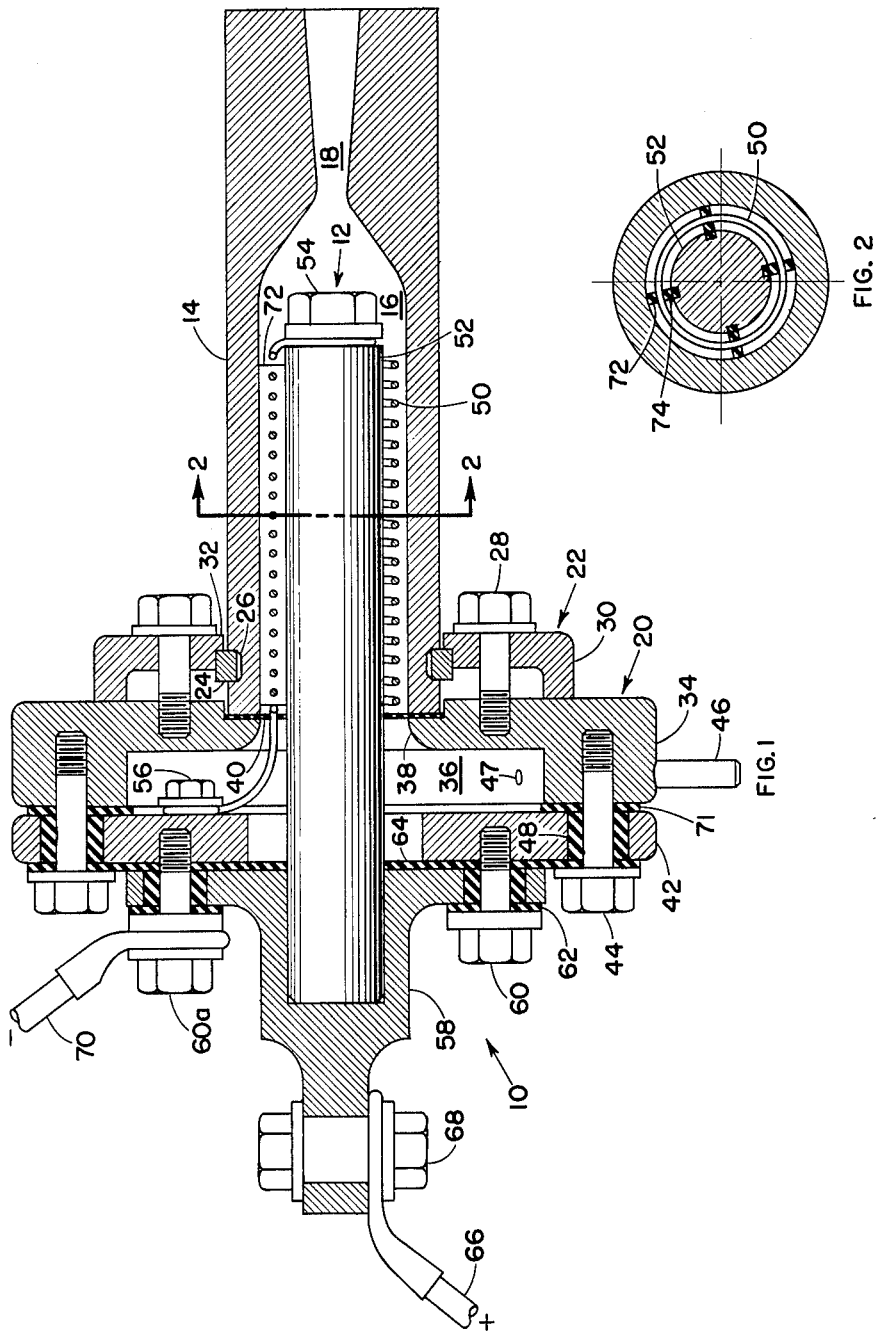

3,210,927
ELECTRO-THERMAL ROCKETS HAVING
IMPROVED HEAT EXCHANGERS
Paul F. Brinich, Lakewood, and John R. Jack, North Olmsted, Ohio, assignors to the United States of America as represented by the Administrator of the National Aeronautics and Space Administration
Filed Oct. 1, 1963, Ser. No. 313,132
12 Claims. (Cl. 60—35.5)
(Granted under Title 35, U.S. Code (1952), sec. 266)

The invention described herein may be manufactured and used by or for the Government of the United States of America for governmental purposes without the payment of any royalties thereon or therefor.

This invention relates to an electro-thermal rocket and, more particularly, to an improved electrically-powered, resistance heated heat exchanger for such a rocket.

Various electro-thermal rocket structures have been proposed, and one of these is described in United States Patent No. 3,016,693. This prior art rocket utilizes a porous metal tube as a heat exchanger, and heat is transmitted to a moving gas through contact with the tube which is resistance heated. This type of heat exchanger is characterized as being a high current, low voltage device requiring large conductors which present power loss problems. Fabrication and attachment problems have likewise been encountered with porous tube heat exchangers. Also, such rockets present problems with connections and seals which must be cooled.

The electrically-powered, resistance heated heat exchanger of the present invention solves these problems encountered in prior art rockets because it is a high resistance device requiring much smaller electrical currents and higher operating voltages which eliminate electric power losses outside the heater. Also, because many of the seals utilized in the present electro-thermal rocket are located in relatively cool parts of the engine, the need for auxiliary cooling is greatly reduced.

The high resistance heat exchanger of the present invention utilizes a wire coil which is readily fabricated and easily attached to the engine. The coil is supported by perforated strips of electrical insulating material which also maintain the spacing between the individual coil turns. The insulator strips fit into slots in a heater core to accommodate a limited degree of motion caused by thermal expansion of the heater.

It is, therefore, an object of the present invention to provide an improved electro-thermal rocket which is readily assembled and requires a minimum of auxiliary cooling.

Another object of the invention is to provide an improved electrically-powered resistance heated heat exchanger for an electro-thermal rocket having the configuration of a simple coil that can be considered as a tube type cross flow heat exchanger thereby enabling performance characteristics to be more accurately determined.

A further object of the invention is to provide an improved electrically-powered resistance heated heat exchanger for an electro-thermal rocket which has a high resistance and requires a small electrical current with high voltages.

Other objects and advantages of the invention will be apparent from the specification which follows and from the drawings wherein like numerals are used throughout to identify like parts.

In the drawings:

FIG. 1 is an axial section view of an improved electro-thermal rocket constructed in accordance with the invention; and FIG. 2 is a sectional view taken along the line 2—2 in FIG. 1.

Referring now to FIG. 1 of the drawings, there is shown an electro-thermal rocket engine 10 having an improved heat exchanger 12 constructed in accordance with the invention. The engine 10 includes an elongated hollow casing 14 of a refractory metal which forms a chamber 16 extending longitudinally from the upstream end of the casing to a convergent-divergent nozzle 18 in the downstream end. The casing 14 is mounted on the rearwardly directed downstream face of an annular plate 20 by a circular clamp 22 which engages a ring 24 that is carried by an annular groove 26 adjacent the upstream end of the chamber 16. Bolts 28 extend through the clamp 22 and threadably engage the plate 20 to maintain a forwardly directed flange 30 on the outer periphery of the clamp 22 in engagement with the plate 20 and a shoulder 32 on the inner periphery of the clamp 22 in engagement with the ring 24. The casing 14 may be selectively disassembled from the plate 20 by removing the bolts 28 and readily reassembled in the reverse manner.

A recessed portion in the circular plate 20 formed by a forwardly directed flange 34 which extends around the periphery of the upstream face of the plate 20 provides a plenum 36 that is in communication with the chamber 16 through a central opening 38 having a rounded inlet. An annular sealing gasket 40 engages the downstream face of the plate 20 and the upstream face of the casing 14. A disc 42 mounted on the upstream end of the plate 20 by bolts 44 which extend into the flange 34 forms the forward wall of the plenum 36, and a gaseous propellant, such as hydrogen, is tangentially introduced into the plenum 36 through an inlet tube 46 which extends through the flange 34 to an opening 47. The disc 42 is maintained out of electrical contact with the plate 20 by insulators 48 on the bolts 44.

According to the present invention, the heat exchanger 12 is mounted on the disc 42, and by removing the bolts 44 the heat exchanger 12 may be readily removed from the remaining portions of the rocket engine 10. The heat exchanger 12 includes a high resistance heating element 50 comprising a cylindrical coil of tungsten wire which extends into the chamber 16 as shown in FIG. 1. An elongated refractory metal core 52 within the coil likewise extends into the chamber 16 to mount the heating element 50 in the rocket engine 10. The downstream end of the heating element 50 is maintained in electrical contact with the core 52 by a screw clamp 54 while the upstream end is similarly connected to the disc 42 by a screw clamp 56 located in the plenum 36.

The upstream or forward end of the core 52 is mounted in an electrically conducting cap 58 that is secured to the disc 42 by bolts 60. The cap 58 is maintained out of electrical contact with the disc 42 by insulators 62 on the bolts 60 and an annular gasket 64. A lead 66 from the positive side of a suitable supply of electric power, such as a power source of the type described in the aforementioned United States Patent No. 3,016,693, is electrically connected to the cap by a connector 68. A lead 70 from the negative side of the aforementioned supply of electrical power is in electrical contact with the disc 42 through one of the mounting bolts 60a to complete the electrical circuit.

In operation, an electric current flows through the positive power lead 66 to the cap 58 where it moves through the heater support core 52 to the attaching screw clamp 54. This current then flows forward through the heating element 50 to the disc 42 whereupon it returns to the power source through the lead 70. The casing 14 is provided with a floating potential to prevent arcing from the heating element 50 to the wall of the chamber 16 in the portions having the highest temperatures, and an annular insulator 71 is interposed between the flange 34 and the disc 42.

An important feature of the invention is the provision of a plurality of strips 72 of insulating material, such as boron nitride, which support the heating element 50 on the core 52. The strips 72 are mounted in longitudinally extending slots 74 spaced about the periphery of the core 52. The wire forming the heating element 50 passes sequentially through spaced holes in the strips 72 which properly position the coil in the chamber 16 and maintain the spacing between the individual coil turns. The strips 72 are free to slide along the slots 74 with a limited degree of motion to accommodate thermal expansion of the heating element 50 and related parts. In addition to providing optimum mechanical support for the wire coil, the insulator strips 72 insure the exposure of a maximum of wire area for efficient heat transfer.

As the current flow raises the temperature of the resistance heating element 50, propellant from the tube 46 enters the plenum 36 through the opening 47 and flows through the central opening 38 into the annular passage in the chamber 16 between the core 52 and the casing 14. The propellant is heated by convection from the heating element 50, and upon entering the nozzle 18, the thermal energy in the heated propellant is converted into thrust. In this manner, hydrogen propellant having mass flows from $0.25 \times 10^{-3}$ to $1 \times 10^{-3}$ pounds per second have been heated at power levels up to 17 kilowatts to produce gas temperatures up to 5,000° R.

The propellant is introduced into the engine 10 from the opening 47 in a tangential fashion, and the cold gas is permitted to pick up heat from the plenum 36. This maintains the upstream end of the engine 10 at a fairly low operating temperature which simplifies the sealing and heat loss problems. The casing 12 is normally enclosed in a thermal insulating container (not shown) to reduce heat losses from the engine 10.

While only one embodiment of the invention has been shown, various structural modifications can be made to the engine 10 without departing from the spirit of the invention or the scope of the subjoined claims. For example, it is contemplated that the heating element may be in the form of a hollow tungsten tube wrapped into a coil shape instead of the solid wire coil as shown. By passing the propellant through this tube as well as around the outer surface of the individual coil turns, greater heating contact is achieved. It is further contemplated that a resistance heater may be made of tapered tungsten wire for optimum results. In this modification, the portion of the coil having the small diameter wire is positioned at the upstream end of the heating element 50 adjacent the opening 38 in the plate 20 while the larger diameters are located in the downstream portion of the chamber 16. This enables the entire coil to operate at a nearly constant temperature which prevents burnout at the downstream end.

What is claimed is:

1. An electrically-powered resistance heated heat exchanger for an electro-thermal rocket comprising
   an elongated high resistance heating element having a cylindrical coil configuration,
   a rigid core extending into said coil to mount the same in said rocket, and
   at least one supporting member positioned between said heating element and said core, said member being mounted on said heating element and in sliding contact with said core.

2. An electrically-powered resistance heated heat exchanger for an electro-thermal rocket comprising
   a high resistance heating element consisting of an electrically conducting coil having spaced turns,
   a rigid core extending into said coil to mount the same in said rocket, and
   a strip of electrical insulating material in sliding contact with said core and having a plurality of spaced apertures therein for contacting the individual coil turns of said heating element to maintain the spacing therebetween, said strip positioned between said heating element and said core to maintain said heating element out of engagement with said core.

3. An electrically-powered resistance heated heat exchanger for an electro-thermal rocket as claimed in claim 2 wherein said heating element consists of a coil of wire.

4. An electrically-powered resistance heated heat exchanger for an electro-thermal rocket as claimed in claim 2 wherein said heating element consists of a coil of electrically conducting tubing.

5. An electrically-powered resistance heated heat exchanger for an electro-thermal rocket of the type wherein the propellant is heated to an elevated temperature comprising
   a high resistance heating element consisting of an electrically conducting coil having spaced turns to accommodate the passage of said propellant,
   a rigid core extending into said coil to mount the same in said rocket, said core having a plurality of spaced slots extending longitudinally along the peripheral surface thereof, and
   a plurality of elongated mounting members positioned between said heating element and said core, each of said mounting members being slidably carried in one of said slots and having a plurality of spaced apertures therein for contacting individual coil turns of said heater.

6. An electrically-powered resistance heated heat exchanger for an electro-thermal rocket as claimed in claim 5 wherein said rigid core comprises
   an elongated refractory metal cylinder, and
   said elongated mounting members comprise strips of insulating material.

7. An electro-thermal rocket engine comprising
   an elongated casing having a chamber therein and a convergent-divergent nozzle in communication with said chamber,
   a plate having a central opening extending therethrough from an upstream face to a downstream face, said plate having a recessed portion in said upstream face forming a plenum about said opening,
   means for supplying a propellant to said plenum,
   clamping means for selectively mounting said casing in engagement with said downstream face of said plate with said chamber in communication with said plenum through said opening,
   a disc secured to said upstream face of said plate,
   an elongated member extending into said chamber,
   a resistance heating element electrically connected to said disc and said member, and
   means for connecting a source of electrical power to said disc and said member for heating said element whereby said propellant is heated in said chamber upon flowing from said plenum to said nozzle.

8. An electro-thermal rocket engine as claimed in claim 7, wherein said propellant supplying means includes
   means for directing said propellant tangentially into said plenum thereby providing a vortex type flow for cooling said upstream face of said plate.

9. An electro-thermal rocket engine as claimed in claim 7, wherein said heating element comprises
   a coil having one end electrically connected to said disc and the opposite end connected to a portion of said elongated member adjacent said nozzle.

10. An electro-thermal rocket engine as claimed in claim 9, wherein said elongated member comprises
   a refractory metal core extending through said coil, and
   means for mounting said core on said disc.

11. An electro-thermal rocket engine as claimed in claim 10, including
   strips of insulating material carried by said core in engagement with said coil.

12. An electro-thermal rocket engine comprising
an elongated casing having a chamber therein with a convergent-divergent nozzle at one end thereof and a plenum at the opposite end,
means for directing a propellant tangentially into said plenum thereby providing a vortex type flow for cooling the walls thereof,
resistance heating means in said chamber having tungsten wire sections spaced from one another,
a plurality of boron nitride members spaced around said chamber for insulating adjacent portions of said resistance heating means from one another, and
means for connecting a source of electrical power to said resistance heating means for heating the same whereby said propellant is heated in said chamber upon flowing from said penum to said nozzle.

References Cited by the Examiner

UNITED STATES PATENTS

| | | | |
|---|---|---|---|
| 631,959 | 8/99 | Gold | 338—304 X |
| 1,247,286 | 11/17 | Kuhn et al. | 338—305 X |
| 3,013,384 | 12/61 | Smith | 60—35.5 |
| 3,016,693 | 1/62 | Jack et al. | 60—35.5 |

FOREIGN PATENTS

| | | |
|---|---|---|
| 521,360 | 3/21 | France. |
| 455,225 | 2/50 | Italy. |

MARK NEWMAN, *Primary Examiner.*

CARLTON R. CROYLE, *Examiner.*